(12) United States Patent
Jungwirth

(10) Patent No.: US 7,359,063 B2
(45) Date of Patent: Apr. 15, 2008

(54) HETERODYNE ARRAY DETECTOR

(75) Inventor: Douglas R. Jungwirth, Reseda, CA (US)

(73) Assignee: The Boeing Company, Chicago, IL (US)

(*) Notice: Subject to any disclaimer, the term of this patent is extended or adjusted under 35 U.S.C. 154(b) by 194 days.

(21) Appl. No.: 11/193,999

(22) Filed: Jul. 29, 2005

(65) Prior Publication Data
US 2007/0024854 A1   Feb. 1, 2007

(51) Int. Cl.
*G01B 9/02* (2006.01)
(52) U.S. Cl. ..................................... 356/484
(58) Field of Classification Search ............... 356/450, 356/484; 398/204, 207
See application file for complete search history.

(56) References Cited

U.S. PATENT DOCUMENTS

| | | | | |
|---|---|---|---|---|
| 4,682,025 A | * | 7/1987 | Livingston et al. | 250/201.9 |
| 5,684,545 A | * | 11/1997 | Dou et al. | 349/1 |
| 6,498,650 B1 | * | 12/2002 | Davies | 356/450 |
| 7,027,161 B2 | * | 4/2006 | Pepper | 356/450 |

* cited by examiner

*Primary Examiner*—Michael A. Lyons
(74) *Attorney, Agent, or Firm*—Gates & Cooper LLP

(57) ABSTRACT

A method and apparatus for correcting an input beam (102) that uses an array of detectors (114) sensing a scanning fringe pattern to generate phase error information which can be corrected by a physically adjacent beam correction device such as an array of micro-electrical-mechanical-system (MEMS) mirrors (116).

26 Claims, 11 Drawing Sheets

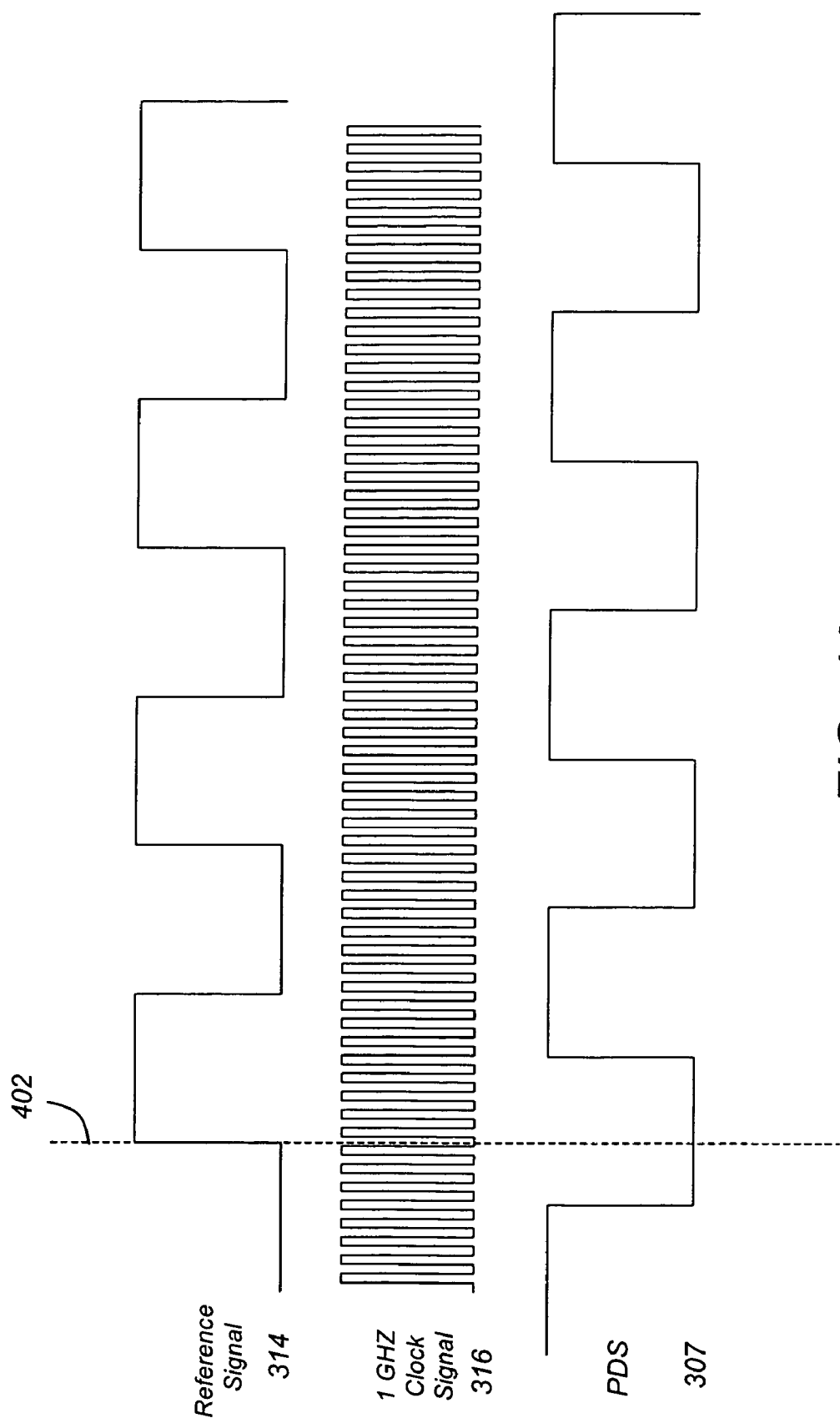

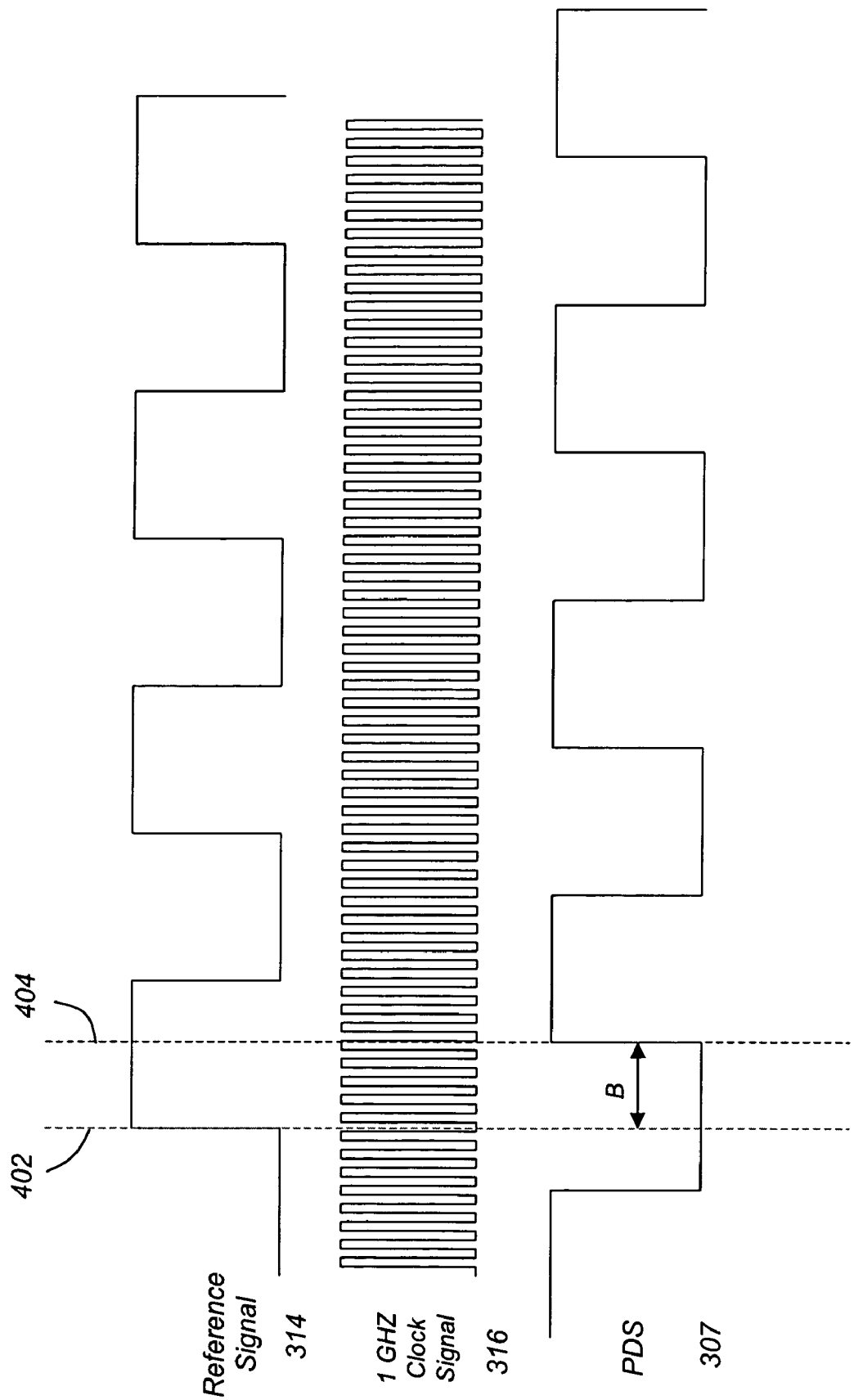

HETERODYNE ARRAY DETECTOR

BACKGROUND OF THE INVENTION

1. Field of the Invention

The present invention relates to systems and methods for correcting optical signal phase errors, and in particular to a system and method for generating an optical fringe pattern, detecting the phase of the fringe pattern, and using the detected phase to correct the optical signal.

2. Description of the Related Art

High speed data transmission is an essential requirement for many emerging technologies. In many cases, this requirement for high bandwidth communications is met using optical communication systems. Unfortunately, optical communications systems are subject to signal degradation. This can occur when the optical signal is transmitted through the atmosphere, at high data rates, or when using high efficiency beam delivery systems. To compensate for such errors, fast, high spatial frequency phase correction is needed. Unfortunately, current compensation systems are slow, relatively coarse, very complicated, consume large amounts of power and space, and very expensive.

What is needed is a high-speed optical compensation system that is simple, inexpensive, and permits fine adjustments. What is also needed is a compensation system that requires minimum power and can be implemented in smaller spaces. The present invention satisfies that need.

SUMMARY OF THE INVENTION

To address the requirements described above, the present invention discloses a method and apparatus for correcting optical signal phase errors. The method comprises the steps of generating a scanning optical heterodyne fringe pattern from an input signal, converting the scanning optical heterodyne fringe pattern to a plurality of oscillating electronic signals, clipping each of the plurality of oscillating electronic signals, and generating a phase map from the plurality of clipped oscillating electronic signals, an reference signal, and a clock signal. The apparatus comprises an interferometer, for generating a detection beam having an scanning optical heterodyne fringe pattern from the input beam, and an integrated beam compensation module, which further comprises a detector array comprising a plurality of detectors, each detector for measuring the phase of a portion of the detection beam, and a segmented mirror array having a plurality of mirror segments, each segment associated with one of the plurality of detectors and each segment for compensating a portion of the input beam associated with the portion of the detector beam according to the measured phase of the portion of the detector beam.

This system, which is a combination of several different innovations to provide a single, combined operational system, provides a small, compact, fast and accurate way of detecting, measuring and correcting the phase front of any incoming or outgoing beam. It is scalable and potentially space qualifiable.

This system uses a Heterodyne Self Referencing Interferometer (HSRI) to sense and measure the incoming phase front at very high temporal frequencies and high spatial frequencies. It provides an analog signal (for each individual detector) proportional to the phase of the wavefront at that particular point to the back of the detector chip. A correction device (which could be a Micro Electrical Mechanical System (MEMS) mirror, spatial light modulator, or deformable mirror) is coupled directly to the outputs of the detector array to provide a point by point correction signal to the individual actuators of the mirror, also at high temporal and spatial frequencies.

Together, the detector and correction device is small (as small as two inches in diameter and one inch thick), light weight (less than one half pound), power efficient (in the order of a few watts), rugged (space qualifyable), inexpensive (since it is produced with standard chip fabrication techniques, fast (in the order of tens of kilohertz bandwidth or greater) and since the detector/mirror array includes from 500 to 1000 actuators, offers high spatial frequency. Advantageously, no computer is involved in any of the data reduction.

BRIEF DESCRIPTION OF THE DRAWINGS

Referring now to the drawings in which like reference numbers represent corresponding parts throughout:

FIGS. 4A-4C are timing diagrams depicting one technique for counting clock pulses to determine phase;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
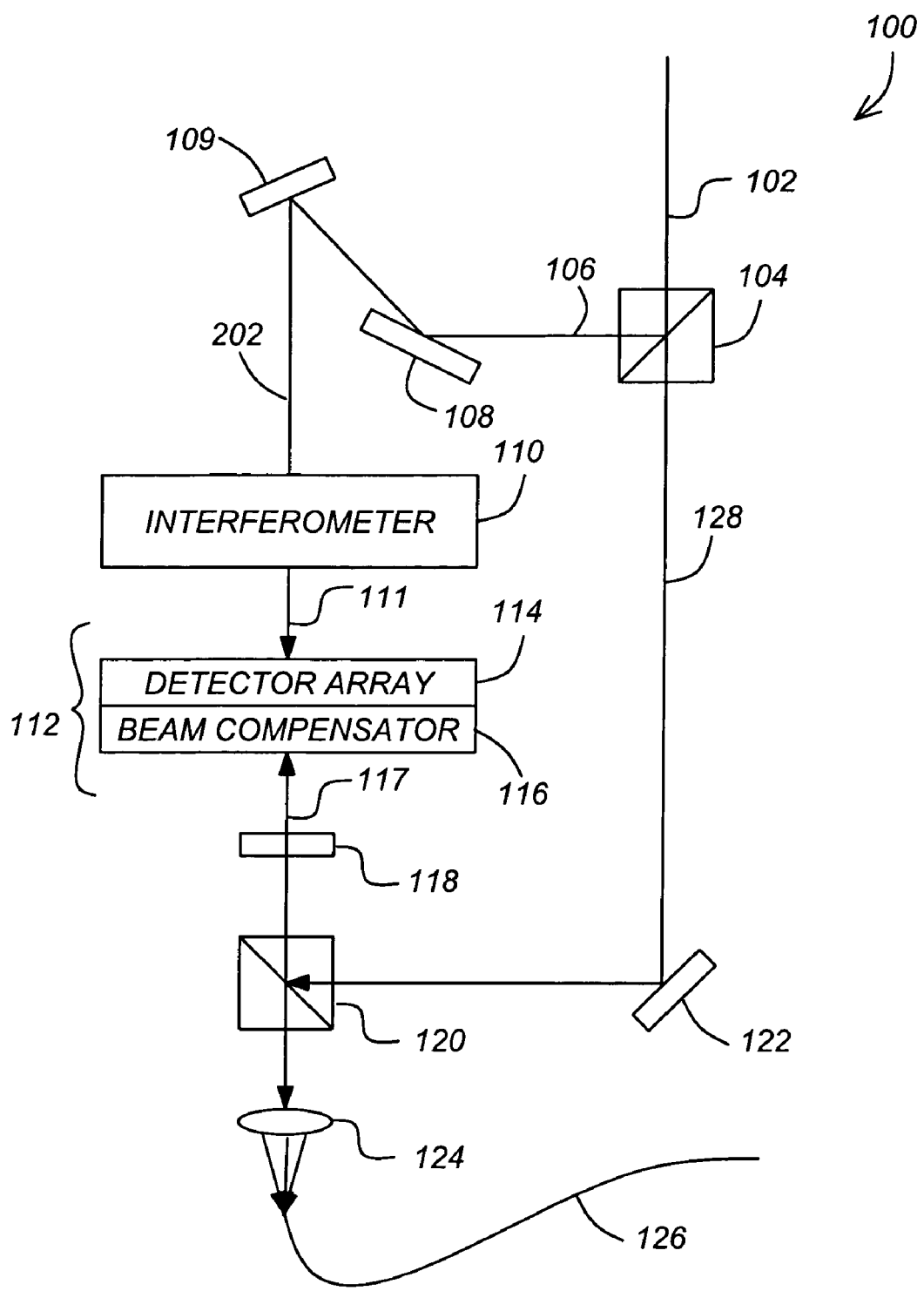
FIG. 1 is a diagram showing one embodiment of the phase correction system.

FIG. 1 is a diagram of one embodiment of a phase correction system 100. An input beam 102 is provided to a beam splitter 104 to generate a first beam 128 and a second beam 106. The second beam 106 is provided to an interferometer 110 via mirrors 108 and 109 (mirror 109 maintains left/right symmetry between the measured beam and the beam that is to be corrected) to generate a detection beam 111 comprising a scanning optical heterodyne fringe pattern. "Fringes" are bright and dark bands of light that are created by the interference of two laser beams of the same frequency of coherent monochromatic light. The pattern of the light and dark bands is a direct result of the differences between one beam and the other, and represents a map of the difference between the two beams. If one beam were flat and the other were concave or convex, a fringe pattern of symmetric circles is the result. If both beams were flat, but tilted with respect to each other, a fringe pattern of straight lines results, and the closer the spacing of the fringes, the "steeper" the incline or slope between the two beams. If the frequency is the same for both beams, then the fringes are stationary and do not move. However, if the frequency of one of the beams changes with respects to the other, the fringes move at the frequency differential between the two beams. For example, the straight line fringes with 10 Hz difference frequency, would scan one direction or the other across the beam with a scanning frequency of 10 Hz.

Hence, scanning fringes are fringes that travel across the field of the beam. The scanning frequency of the fringe pattern refers to the frequency at which intensity peaks travel across a point in the field of the beam in a given unit of time. In one embodiment, the fringes scan at about 1 MHz, meaning that fringe pattern is moving such that on a particular portion of the beam, the amplitude of the fringe pattern is oscillating at 1 MHz. A beam compensation module 112 receives the detection beam 111 and controls a correction device or compensation module 116 to correct aberrations of the input beam.

The beam compensation module 112 comprises a detector array 114 and a beam compensator 116. The detector array 114 has an array of individual detectors, each of which receives a portion of the detection beam and determines the phase of the detection beam at each of the individual detector locations. This phase information is provided directly to the physically coupled and adjacent beam compensator 116. This is accomplished via micro-dots, a ball grid array (BGA), or other conductors on the detector array 114 and adjacent input pads on the beam compensator 116 (hereinafter referred to as the mirror array 116) that are aligned with the micro-dots.

In one embodiment, the beam compensator 116 is a deformable mirror or mirror array having a plurality of mirror segments, with each mirror segment in the mirror array 116 approximately the same size as the area of it's associated detector in the detector array 114. In this embodiment, each detector in the detector array 114 drives its associated and adjacent mirror segment to compensate for the phase error measured by the detector. In one embodiment the mirror array 116 is a MEMS mirror such as those available from the BOSTON MICROMACHINE CORPORATION.

Input beam 102 aberrations are corrected by providing the input beam to the beam compensator 116. In the illustrated embodiment, this is accomplished by providing the first beam 128 from the beamsplitter 104 to a second mirror 122 and thence to a polarization beam splitter cube (PBSC) 120, and further through a ¼ wave plate 118 to the mirror array 116. The signal is then reflected back through the ¼ wave plate 118 a second time to the PBSC 120 by the individual mirror segments in the mirror array 116, with the piston, tip and tilt of each of the individual mirror segments in the mirror array 116 compensating the input beam. The compensated input beam may then focused by lens 124 and provided to a fiber optic 126 for transmission.

Figure 2A:
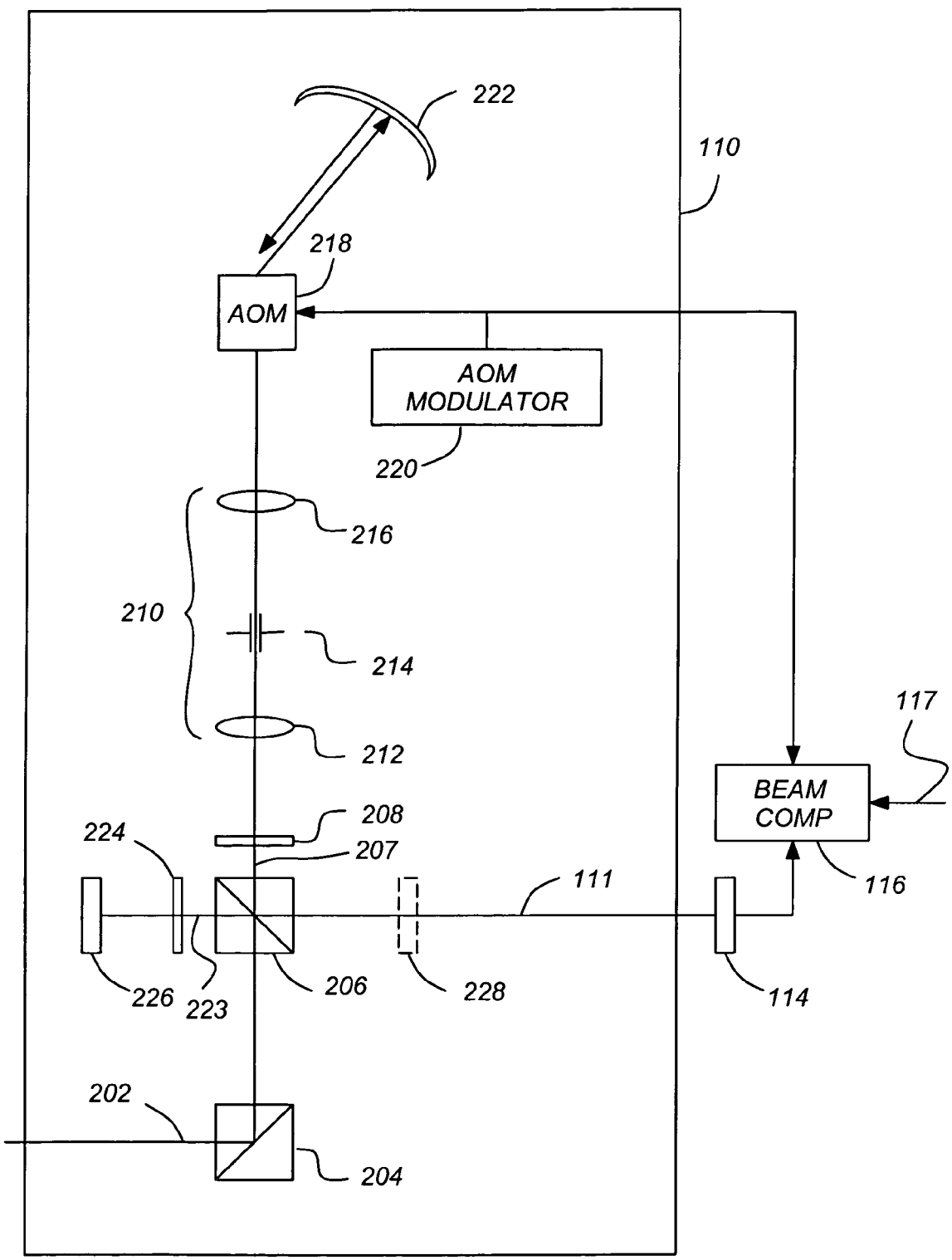
FIGS. 2A and 2B are drawings depicting embodiments of an interferometer that can be used to produce a scanning heterodyne fringe pattern.

FIG. 2A is a diagram depicting one embodiment of an interferometer 110 that can be used to implement the present invention. This interferometer 110 is a self-referencing interferometer with an acousto-optic modulator on the "reference" arm to provide scanning fringes instead of stable, fixed fringes.

The input signal 202 is provided to a polarization beam splitter/combiner 206 via reflector 204 to produce a reference arm beam 207 and a test arm beam 223. The reference arm beam 207 is provided to a beam compacting telescope 210 via a ¼ wave plate 208. The beam compacting telescope 210 comprises a first 212 and second 216 lens and a spatial filter 214, to remove aberrations in the beam. In one embodiment, the spatial filter 214 is a "pinhole" filter, in which the beam is focused through a small pinhole in a non transmitting material and only the central "clean" portion of the beam is allowed through. The second lens 216 focuses the beam into the active region of the acousto-optic modulator (AOM) 218.

The compacted converging beam is received by the AOM 218. The AOM 218 introduces a frequency shift on the light that is deflected through the AOM 218. In the illustrated embodiment, the AOM 218 is running at ½ of the fringe scan frequency or 500 KHz. The output of the AOM 218 is provided to a curved mirror 222, and reflected back to the AOM 218.

In one embodiment, the curved mirror is a spherical mirror having a radius of curvature equal to the spacing between it and the center of the AOM medium 218. The curved mirror 222 and the AOM 218 are placed such that the curved mirror 222 reflects the beam from the AOM 218 directly back through the AOM 218, thus again shifting the frequency of the beam. The phase of the beam is then cleaned up by passing it through the telescope 210 with the pinhole spatial filter (which now expands the beam).

The resulting beam is then combined at the PBSC 120 with the test beam 223 (via reference mirror 226 and ¼ wave plate 224) and passed through a polarizer 228 to create a fringe pattern of the incoming beam with 1 MHz scanning fringes. Because of the frequency shift of the "cleaned up" beam, as provided by the AOM 218, the fringes scan at twice the acoustical frequency of the AOM 218, allowing AC detection of the phase at any point in the beam. The AOM modulator 220 is a frequency generator, which feeds an oscillating electrical signal to the AOM 218. The AOM changes the "frequency" of one of the laser beams with respects to the other to provide "scanning" fringes. The pattern of the fringes (either scanning or stationary) represents the topographic difference between one beam and the other.

The interfered beam with scanning fringes is provided to the detector array 114. The detector array 114 includes a plurality of parallel output channels, each channel producing an analog signal which is proportional to the phase measured at the detector's location in the interfered beam. This signal is provided to the beam compension 116, which produce the correction phase map. In one embodiment, the analog signal is provided to the electronics via a one or more micro dots for each channel corresponding to the associated position in the beam.

In some cases, the optical path length of the "reference" path (the beam going from PBSC 206 to Mirror 222 and back again) and the "test" path (the beam going from the PBSC 206 to mirror 226 and back again) need to be matched to make sure that the temporal fluctuations overlap between the two beams. This can be done most easily by correcting the path length of the "test" path.

Figure 2B:
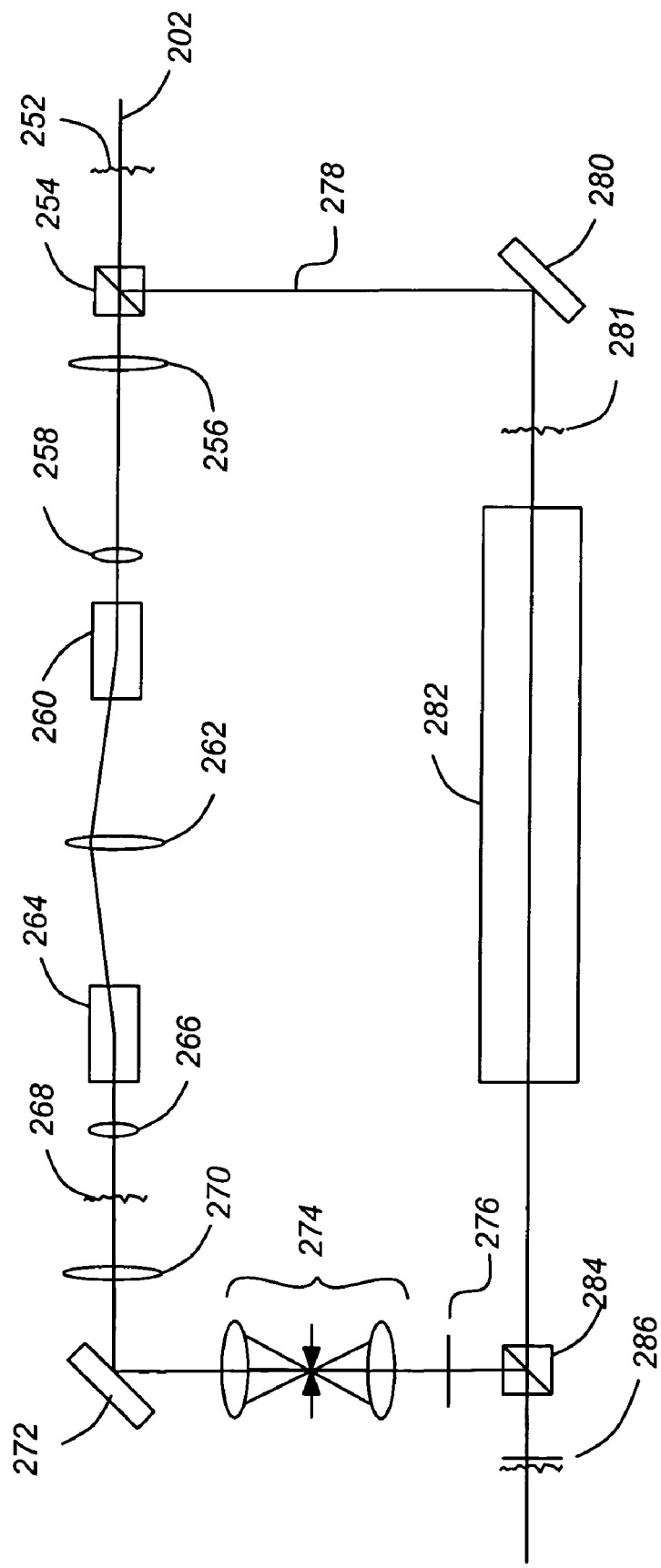

FIG. 2B is a diagram of an alternate embodiment of the interferometer 110. In this embodiment, the input beam 202 (which is described by corrupted wavefront 252 is provided to beamsplitter 254, which produces a first beam and a second beam from the input beam. The first beam is focused by a first lens 256 and a second lens 258, and provided to a conventional upconverting 20 MHz AOM 260, through lens 262, and to a 19 MHz downconverting AOM 264 to produce a frequency-shifted aberrated beam 268. This aberrated beam 268 is provided to a Piezo mirror 272 for tilt correction, and thence to a spatial filter 274 to provide a frequency-shifted "clean" beam 276. This is combined with a second beam reflected from the beamsplitter 254 and by the mirror 280 through a matching plate 282, which matches for path differences for the beams entering the combiner 284. The combined aberrated beam 281 and clean beam 276 provide the scanning fringes that are then provided to the detector array 114.

Figure 3A:
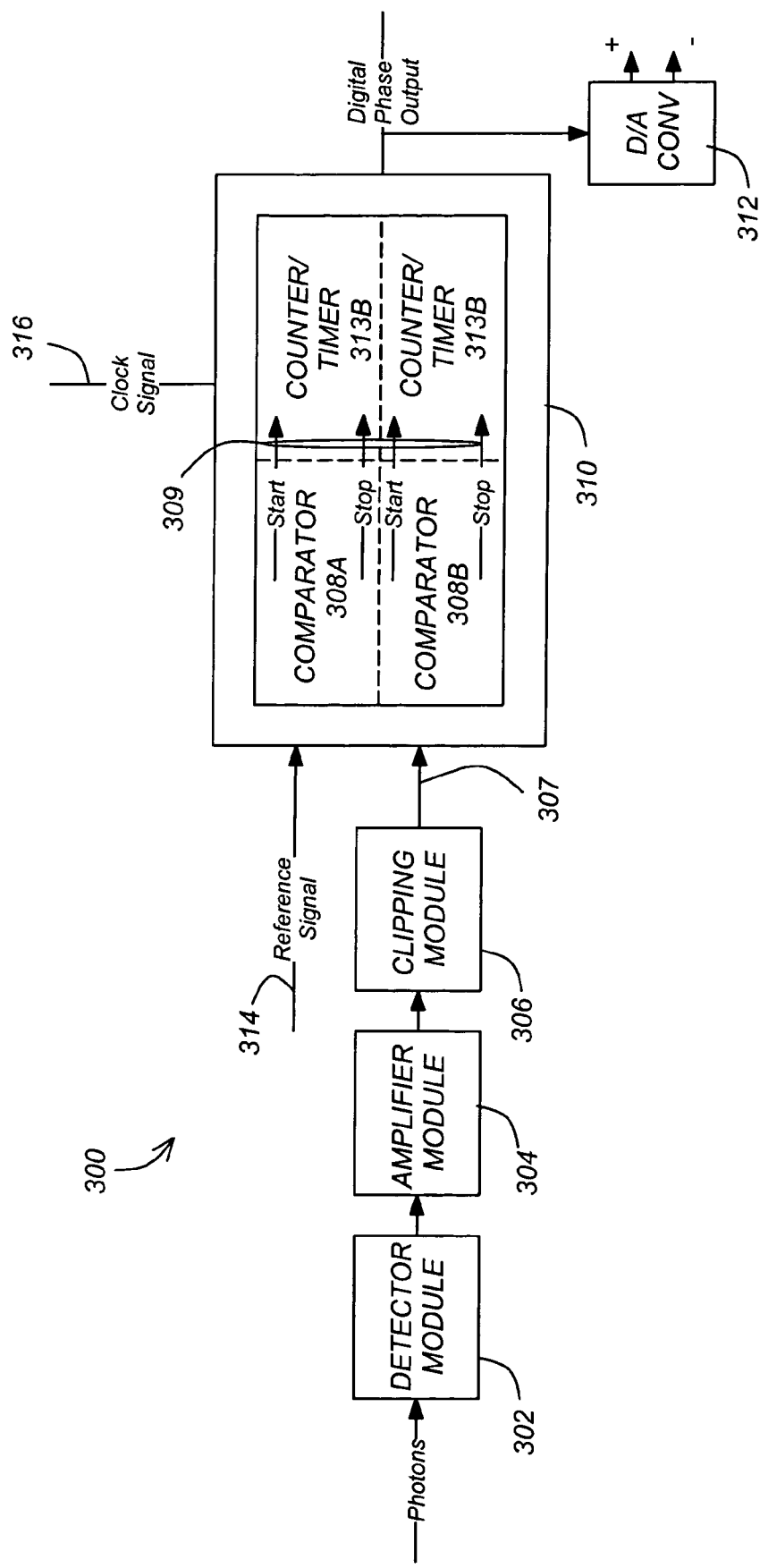
FIGS. 3A and 3B are diagrams depicting one embodiment of the detector array.

FIG. 3A is a block diagram of the detector array 114. The detector array comprises a plurality of detectors 300, each comprising a detector module 302, an amplifier module 304, a clipping module 306, a comparator/timing module 310, and a digital to analog (D/A) converter module 312. The detector module 302 receives photons from the scanning fringe beams and converts them into an oscillating electronic signal. The oscillating electronic signal is provided to an optional amplifier module 304, which can amplify the oscillating electronic signal as required. In one embodiment, the detector comprises a trans-impedance amplifier. The amplifier module 304 may also include automatic gain control (AGC), such that the peak-to-peak amplitude of the output of the amplifier module 304 is a constant value. regardless of the amplitude of the light. The amplifier module 304 may also be tuned to the frequency of the incoming signal (nominally 1 MHz) to exclude extraneous signals. The oscillating (and sinusoidal) electronic signal is provided to a clipping module 306 to clip the peaks of the sinusoidally oscillating electronic signal, thus producing a pseudo-digital (but still oscillating) signal 307. This pseudo-digital signal (PDS) 307 is provided to a comparator/timing module 310. The comparator/timing module 310 includes one or more comparators 308A and 308B that provide start and stop signals to one or more associated counters 313A and 313B that count the number of transitions of a clock signal 316, using the PDS 307 and start/stop signals 309. The reference signal 314 can be externally generated (e.g. by an clock external to the detector 300) or internally generated (e.g. by a clock internal to the detector 300). Alternatively, a PDS 307 generated by one of the detectors 300 in the detector array 114 can be used as the reference signal for all of the detectors in the detector array 114, if desired.

As is described further below, the phase of the PDS 307 is determined by counting clock 316 pulses Hence, the clock signal 316 must be at a substantially higher frequency than the PDS 307. In the illustrated embodiment, the clock signal is 1 GHz. Varying the clock 316 speed can also provide for external scaling.

Figure 3B:
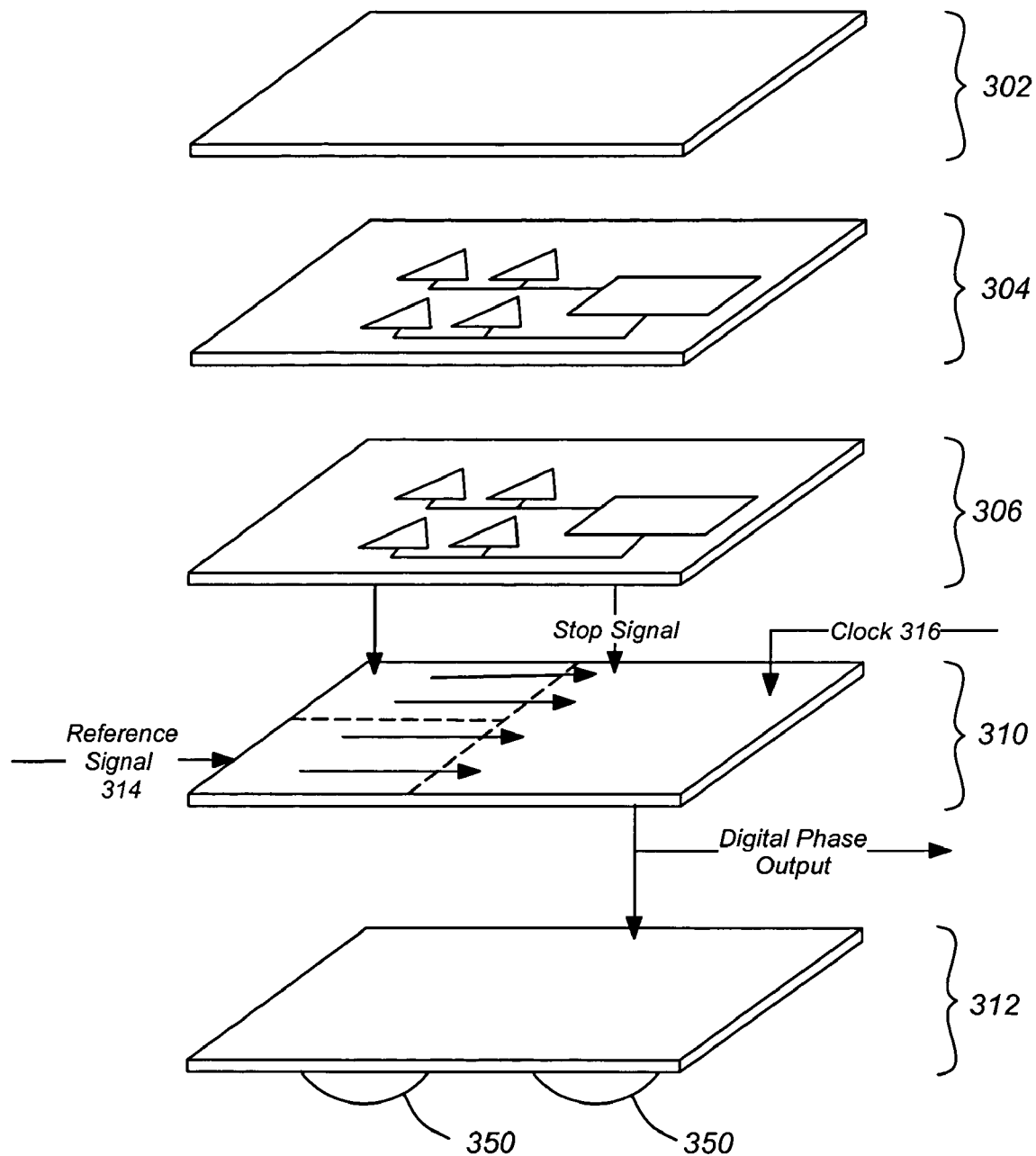

FIG. 3B is a diagram showing a physical representation of an embodiment of the detectors 300 in the detector array 114. In this embodiment, each detector 300 is implemented by on a portion of a multi-layer circuit board, or a portion of a silicon chip surface or on a portion of a layering of separate circuit boards in which the layers are electrically coupled. The first layer 302 includes the detector module 302 and may comprise a silicon/germanium detector layer. The second layer 304, third layer 306, and fourth layer implement the amplifier module 304, clipping module 306, comparator/timing module 310, and D/A converter module 312, respectively. The digital phase output can be used to view the phase information from each individual detector or to combine them together to give a phase 'map' of the incoming beam. It can also be used to digitally represent the incoming beam if desired.

In the illustrated embodiment, the last layer 312 includes two or more micro-dots 350. The digital phase computed by the comparator/timing module 310 is provided to the digital to analog module 312 and converted into an analog signal which is provided to these micro-dots 350, in the aggregate, providing an analog phase map. Each of the micro-dots 350 are placed in electrical contact with an adjacent pad that provides an input to a mirror element on the mirror array 116 associated with the detector 300.

Of course, if space permits, the number of layers can be reduced by combining the functionality of more than one layer into a single layer. For example, the amplifier layer 304 and the clipper layer 306 may be implemented in a single layer.

Figure 4C:
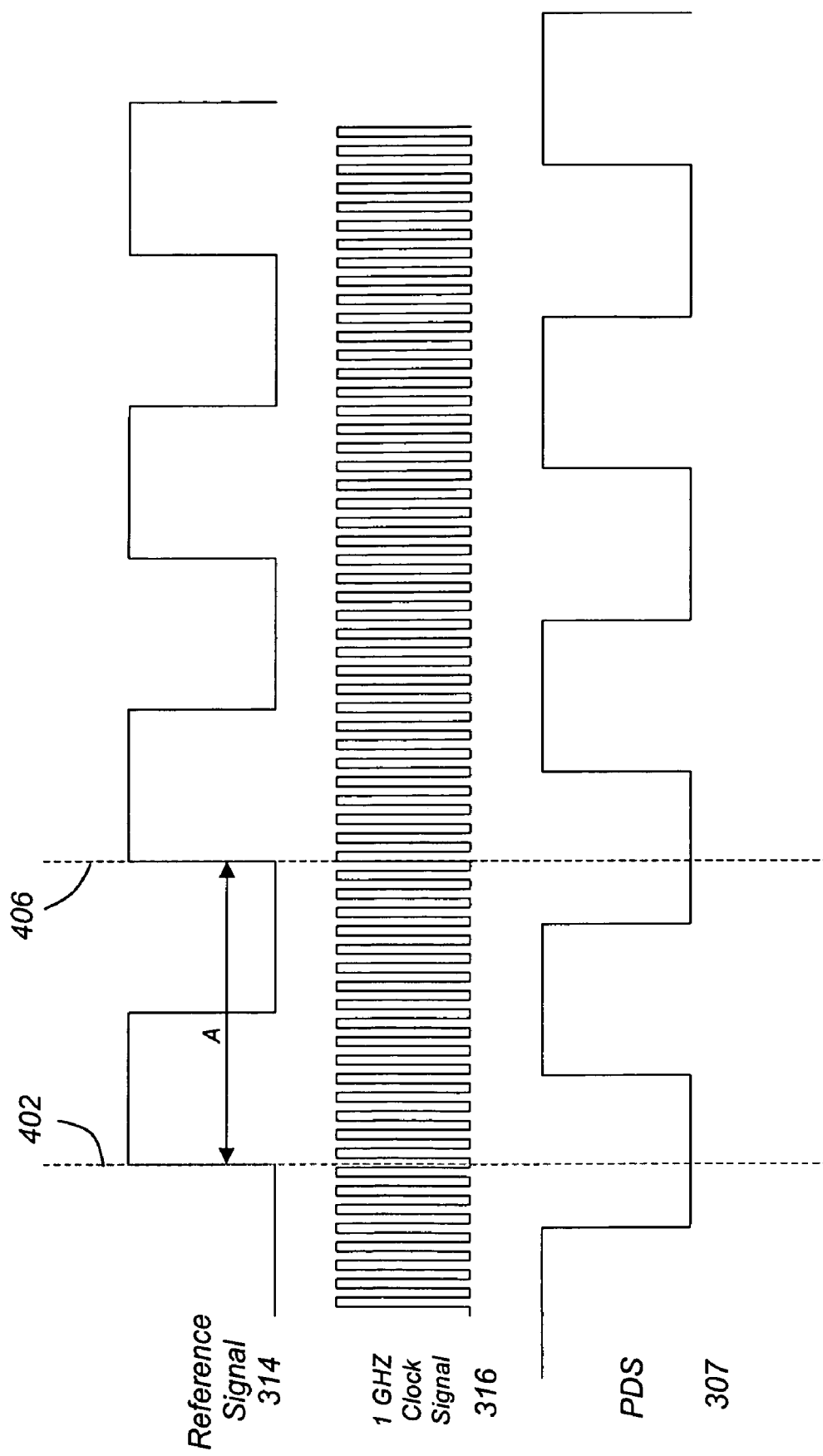

FIGS. 4A-4C are diagrams depicting one technique for counting clock pulses to determine phase. In this embodiment, the comparator/timing module 310 includes a first counter 308 and a second counter 311. Using the reference signal 314, the comparator module 308 generates a start signal when the external reference signal transitions from one state to another (in the illustrated embodiment, the transition is from low state to a high state), as indicated by line 402 in FIG. 4A. The start signal is provided to the counter module 313 which resets and starts a first counter and a second counter. The first and second counters then begin counting 1 GHz clock cycles of the clock signal 316.

As shown in FIG. 4B, when the pseudo digital signal (PDS) transitions from one state to another (in the illustrated embodiment from a low state to a high state) the timing module 311 commands the second counter to stop counting. The second counter then latches the data (the number of clock cycles for the clock signal 316 signal during interval "B") for readout.

As shown in FIG. 4C, when the reference signal 314 transitions again, indicating that one period of the reference signal 314 has elapsed (in the illustrated embodiment, from a low state to a high state), the timing module 308 commands the first counter to stop counting, and the data (the number of clock cycles for the clock signal 316 during interval "A") is stored therein is latched. This also signals the beginning of the count for the next cycle of the reference signal 314.

It should be noted that the foregoing can also be implemented by using different state transitions of the reference signal 314. For example, transitions from a high state to a low state can also be used to start and stop the counting.

The number of counts is provided to the counter/timer 313 which generates an estimate of the phase of the oscillating electronic signal. The phase can be estimated, for example, as follows:

$$\theta = \frac{B}{A} 2\pi + int(2\pi)$$

where int(•) provides the integer number of the argument •. The int(2π) factor accounts for the fact that there may be more than one fringe extending spatially across the interference plane. Note that each individual detector does not know how many fringes are present across the detector array 114, but this can be determined with additional signal processing. In one embodiment, that value is defined as zero, to limit the range requirements for the D/A converter 312 and the MEMS mirror stroke.

Using the foregoing technique, each detector channel can determine the phase at that point in the interference plane. The selection of the clock signal 316 determines the resolution of this determination. For example, since we have used a 1 GHz clock signal 316 for purposes of illustration, the resolution is approximately one part in one thousand. The phase result can be output at the rate of the PDS 307 (1 MHz in the foregoing example), and with latencies of approximately 205 microseconds. If desired, sequential phase results can be averaged to improve accuracy at the expense of latency. The measured phase from each of the detectors is used to generate a phase map, which is used to control the beam compensator 116

Figure 5:
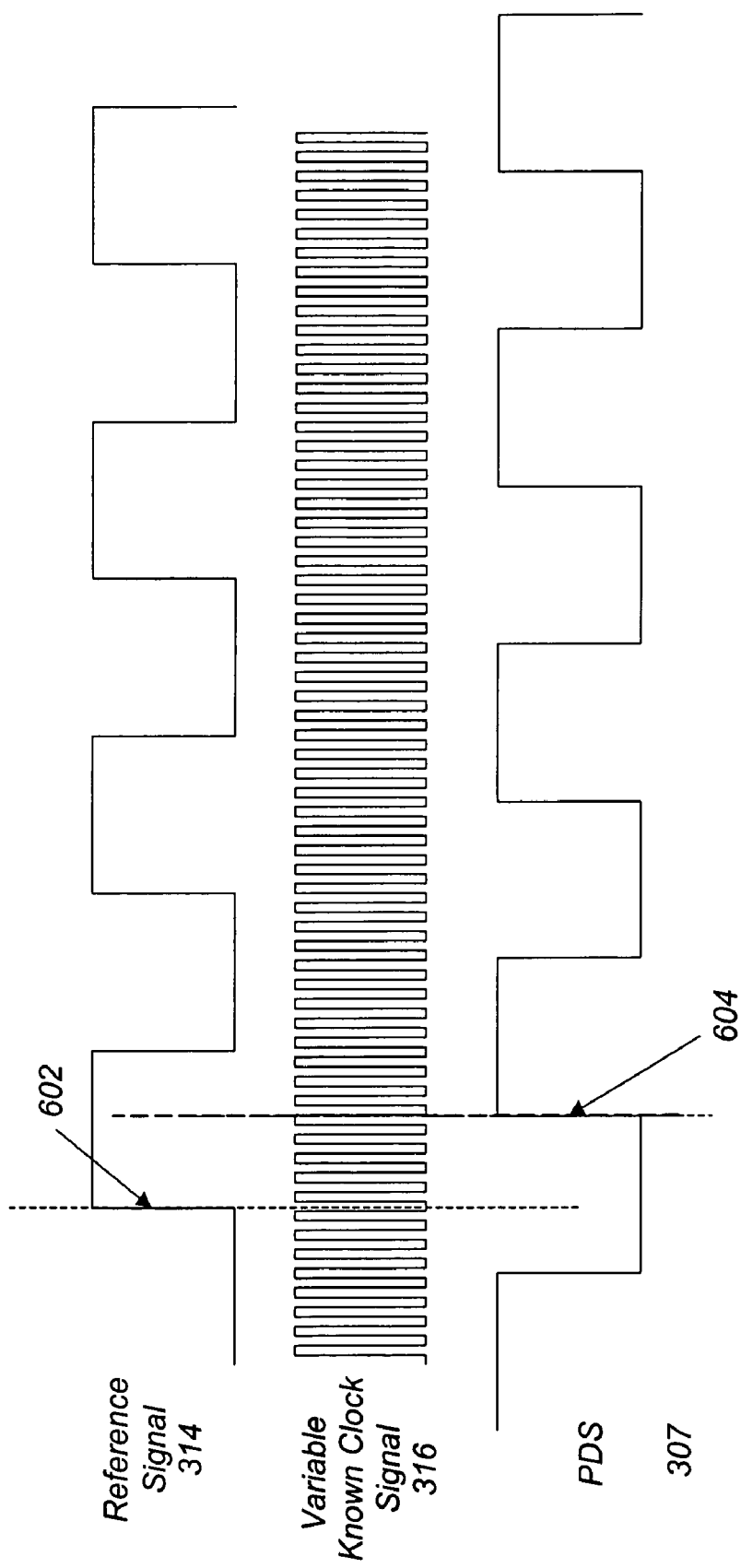
FIG. 5 is a timing diagram depicting an alternative technique for counting pulses to determine phase.

FIG. 5 is a diagram showing another technique for counting clock signal 316 pulses to determine phase. This embodiment requires a single counter, which is started at the transition 602 of the reference signal 314, and stopped at the transition of the PDS 307. Since the number of clock cycles within a period is known, the value of "A" is known, and the phase can be computed from the value of "B" as shown above. If the relationship between the clock 316 and the drive frequency of the AOM modulator 220 is known, then there is no need to measure the previous "A". That value is the ratio of those two numbers. The use of a variable clock signal allows for pathlength scaling since if the clock frequency is halved (e.g. 500 MHz), the outcome is equivalent to dividing the phase obtained with a 1 GHz clock by two. Pathlength scaling could be needed if the correction beam is reflected off the beam compensator 116 twice instead of the shown once. In that case, the "correction" needed to be applied to each mirror segment is only half (per bounce)

Figure 6:
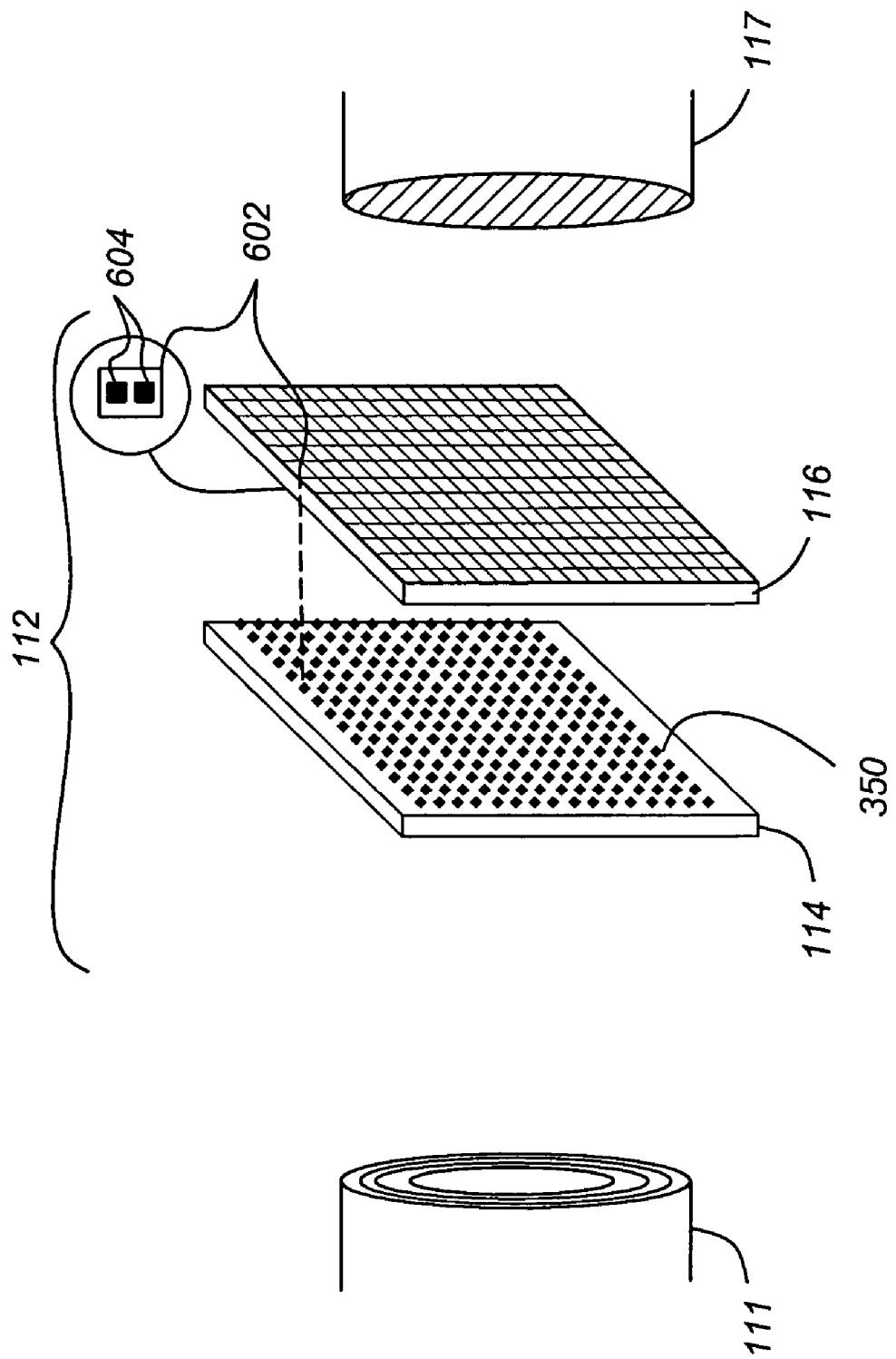
FIG. 6 is a diagram showing an exploded view of one embodiment of the beam compensation module.

FIG. 6 is a diagram showing an exploded view of the beam compensation module 112. The detector array 114 receives the detector beam 111 having the scanning optical fringe pattern from the interferometer 110. Each detector generates a signal indicating the phase of the incoming beam at the physical location of the detector, and provides that signal to one or more micro-dots 350 or a BGA at the side of the detector array opposite the detector beam 111. Then, each mirror segment 602 of the mirror array 116 includes pads 604 which are aligned with the associated micro-dots 350 on the detector array 114. When the beam compensation module 112 is assembled, the micro-dots 350 and the pads 604 are placed in physical and electrical contact thus providing measured phase information to each mirror segment 602 and allowing the mirror segment 602 to change its characteristics to alter the input beam 117 to compensate for phase anomalies.

Figure 7:
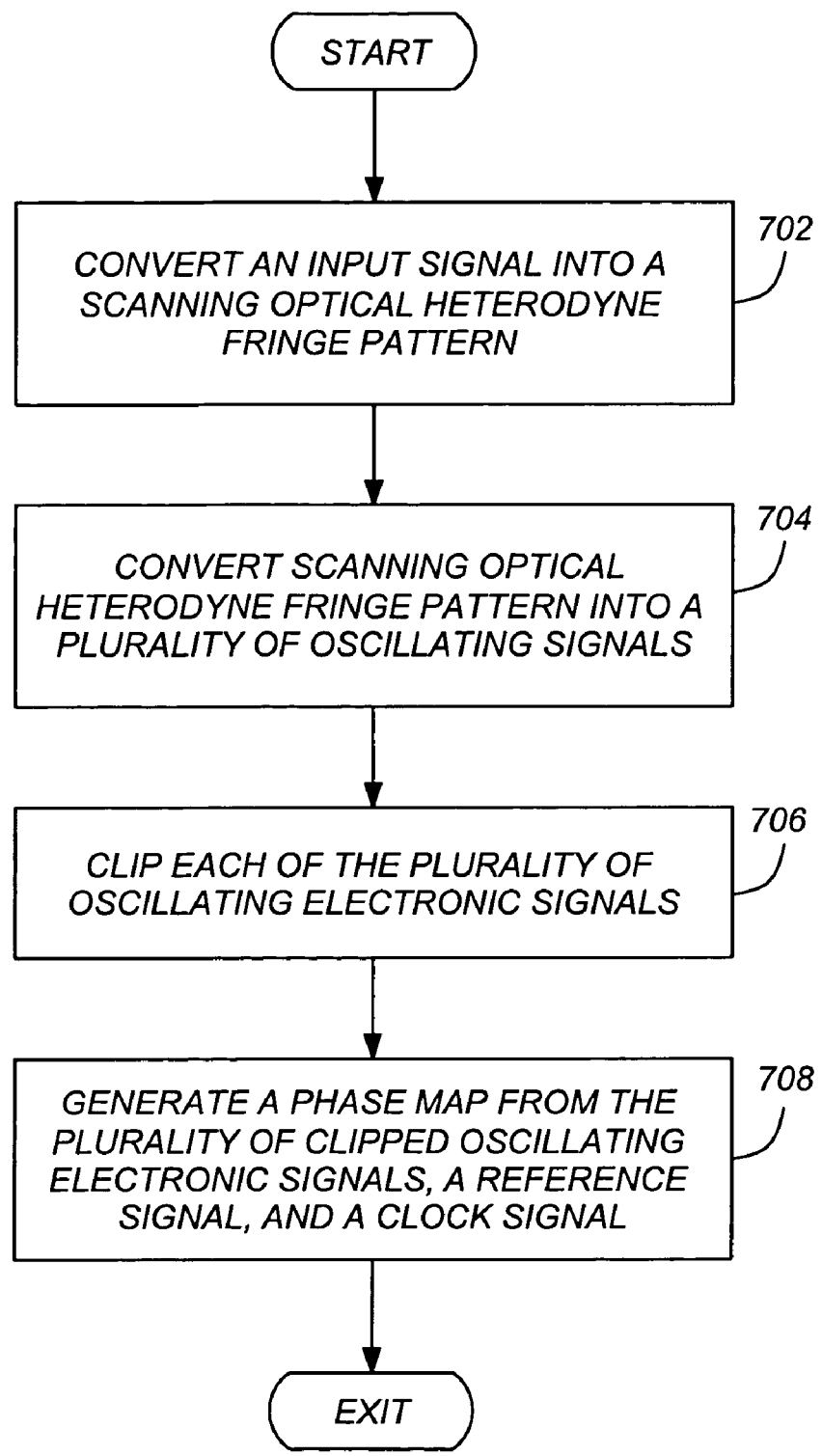
FIG. 7 is a flow chart illustrating the techniques used in the phase correction system.

FIG. 7 is a flow chart illustrating the technique described above. An scanning optical heterodyne fringe pattern is generated from an input signal, as shown in block 702. The scanning optical heterodyne fringe pattern is then converted into a plurality of oscillating signals, each representing the scanning heterodyne fringe pattern oscillations at spatially disclosed locations in the fringe pattern. This is shown in block 704. Each of the plurality of oscillating electronic signals is clipped as shown in block 706 and used to generate a phase map, as shown in block 708.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A phase correction system for correcting the phase of an input beam, comprising:
    an interferometer, for generating a detection beam having an scanning optical fringe pattern from the input beam;
    an integrated beam compensation module, comprising
        a detector array comprising a plurality of detectors, each detector for measuring a phase of a portion of the detection beam; and
        a segmented mirror array having a plurality of mirror segments, each segment associated with one of the plurality of detectors and each segment for compensating a portion of the input beam associated with the portion of the detector beam according to the measured phase of the portion of the detector beam;
    wherein each detector in the detector array comprises:
        an optical detector, for converting the scanning optical fringe pattern into a plurality of oscillating electronic signals;
        a clipping module, for clipping the plurality of oscillating electronic signals; and
        a counter module, for generating a phase map from the plurality of clipped oscillating electronic signals, a reference signal, and a clock signal.

2. The system of claim 1, wherein each mirror segment is disposed adjacent its associated detector on a side of the detector opposing the detection beam.

3. The system of claim 2, wherein each minor segment is a micro-electrical-mechanical-system (MEMS) mirror.

4. The system of claim 1, wherein the optical detector is a silicon detector.

5. The system of claim 1, wherein each detector in the detector array further comprises an amplifier for amplifying the oscillating electronic signals.

6. The system of claim 5, wherein the amplifier comprises an automatic gain control circuit.

7. The system of claim 6, wherein the amplifier is a trans-impedance amplifier.

8. The system of claim 6, wherein the amplifier is tuned to an oscillation frequency of the fringe pattern.

9. The system of claim 1, wherein the counter module comprises a counter, and wherein each detector further comprises a timing module configured to start a counter upon a first transition of the reference signal, to stop the counter upon a transition of the clipped oscillating electronic signal, and to generate a phase for the portion of the detector beam from a value of the counter.

10. The system of claim 1, wherein the counter module comprises a first counter and a second counter, and wherein each detector further comprises a timing module configured to:
    start the first counter upon a transition of the reference signal;
    start the second counter upon the transition of the reference signal;
    stop the second counter upon a transition of the clipped oscillating signal;
    stop the first counter upon a second transition of the reference signal; and
    generate a phase for the portion of the detector beam from a value of the first counter and a value of the second counter.

11. The system of claim 1, wherein the interferometer comprises:
    a beamsplitter for generating a first beam and a test beam from the input beam;

an acousto-optic modulator for frequency shifting the first beam to produce a second beam; and a spatial filter for spatially filtering the second beam to produce a third beam;

wherein the beamsplitter combines the test beam and the third beam to produce the reference beam.

12. The system of claim 11, further comprising:

a mirror, for reflecting a first frequency shifted reference beam back to the acousto-optic modulator to further frequency shift the first frequency shifted reference beam to generate the second beam.

13. The system of claim 12, wherein the mirror comprises a radius of curvature equal to a distance between the acousto-optic modulator and the mirror.

14. A phase correction system for correcting the phase of an input beam, comprising:

interferometer, for generating a detection beam having an scanning optical fringe pattern from the input beam;

an integrated beam compensation module, comprising a detector array comprising a plurality of detectors, each detector for measuring a phase of a portion of the detection beam; and a segmented mirror array having a plurality of mirror segments, each segment associated with one of the plurality of detectors and each segment for compensating a portion of the input beam associated with the portion of the detector beam according to the measured phase of the portion of the detector beam;

wherein the interferometer comprises:

a beamsplitter for generating a first beam and a test beam from the input beam;

an acousto-optic modulator for frequency shifting the first beam to produce a second beam; and a spatial filter for spatially filtering the second beam to produce a third beam;

wherein the beamsplitter combines the test beam and the third beam to produce the reference beam.

15. The system of claim 14, wherein each mirror segment is disposed adjacent its associated detector on a side of the detector opposing the detection beam.

16. The system of claim 15, wherein each minor segment is a micro-electrical-mechanical-system (MEMS) mirror.

17. The system of claim 14, wherein each detector in the detector array comprises:

an optical detector, for converting the scanning optical fringe pattern into a plurality of oscillating electronic signals;

a clipping module, for clipping the plurality of oscillating electronic signals; and a counter module, for generating a phase map from the plurality of clipped oscillating electronic signals, a reference signal, and a dock signal.

18. The system of claim 17, wherein the optical detector is a silicon detector.

19. The system of claim 17, wherein each detector in the detector array further comprises an amplifier for amplifying the oscillating electronic signals.

20. The system of claim 19, wherein the amplifier comprises an automatic gain control circuit.

21. The system of claim 20, wherein the amplifier is a trans-impedance amplifier.

22. The system of claim 20, wherein the amplifier is tuned to an oscillation frequency of the fringe pattern.

23. The system of claim 17, wherein the counter module comprises a counter, and wherein each detector further comprises a timing module configured to start a counter upon a first transition of the reference signal, to stop the counter upon a transition of the clipped oscillating electronic signal, and to generate a phase for the portion of the detector beam from a value of the counter.

24. The system of claim 17, wherein the counter module comprises a first counter and a second counter, and wherein each detector further comprises a timing module configured to:

start the first counter upon a transition of the reference signal;

start the second counter upon the transition of the reference signal;

stop the second counter upon a transition of the clipped oscillating signal;

stop the first counter upon a second transition of the reference signal; and generate a phase for the portion of the detector beam from a value of the first counter and a value of the second counter.

25. The system of claim 14, further comprising:

a mirror, for reflecting a first frequency shifted reference beam back to the acousto-optic modulator to further frequency shift the first frequency shifted reference beam to generate the second beam.

26. The system of claim 14, wherein the mirror comprises a radius of curvature equal to a distance between the acousto-optic modulator and the mirror.

* * * * *